United States Patent
Dallin (10) Patent No.: US 7,058,857 B2
(45) Date of Patent: Jun. 6, 2006

(54) METHOD AND SYSTEM FOR TESTING A SOFTWARE PRODUCT

(75) Inventor: Michael Dean Dallin, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 665 days.

(21) Appl. No.: 09/973,748

(22) Filed: Oct. 10, 2001

(65) Prior Publication Data

US 2003/0070119 A1    Apr. 10, 2003

(51) Int. Cl.
G06F 11/00    (2006.01)

(52) U.S. Cl. ...................................................... 714/38
(58) Field of Classification Search .................. 714/38
See application file for complete search history.

(56) References Cited

U.S. PATENT DOCUMENTS

| | | | | |
|---|---|---|---|---|
| 4,177,520 A * | 12/1979 | Neff | ............................ | 708/169 |
| 5,121,472 A * | 6/1992 | Danish et al. | ................. | 710/67 |
| 5,745,767 A | 4/1998 | Rosen et al. | | |
| 5,754,755 A * | 5/1998 | Smith, Jr. | ..................... | 714/38 |
| 5,758,061 A * | 5/1998 | Plum | ............................ | 714/35 |
| 5,781,720 A | 7/1998 | Parker et al. | | |
| 5,905,856 A | 5/1999 | Ottensooser | | |
| 6,002,868 A | 12/1999 | Jenkins et al. | | |
| 6,002,869 A | 12/1999 | Hinckley | | |
| 6,002,992 A | 12/1999 | Pauwels et al. | | |
| 6,047,389 A | 4/2000 | Thai | | |
| 6,067,639 A | 5/2000 | Rodrigues et al. | | |
| 6,112,312 A * | 8/2000 | Parker et al. | .................. | 714/32 |
| 6,167,534 A | 12/2000 | Straathof et al. | | |
| 6,189,116 B1 | 2/2001 | Mongan et al. | | |
| 6,219,802 B1 | 4/2001 | Beeker et al. | | |
| 6,408,403 B1 * | 6/2002 | Rodrigues et al. | ............. | 714/38 |
| 6,490,695 B1 * | 12/2002 | Zagorski et al. | ............... | 714/38 |
| 6,775,824 B1 * | 8/2004 | Osborne et al. | ............ | 717/125 |
| 2002/0029377 A1 * | 3/2002 | Pavela | ......................... | 717/124 |
| 2003/0028856 A1 * | 2/2003 | Apuzzo et al. | ............. | 717/124 |
| 2004/0078684 A1 * | 4/2004 | Friedman et al. | .............. | 714/38 |
| 2005/0193269 A1 * | 9/2005 | Haswell et al. | ................ | 714/38 |

FOREIGN PATENT DOCUMENTS

| | | |
|---|---|---|
| JP | 10149301 A | 6/1998 |
| WO | WO 96/11438 | 4/1996 |

OTHER PUBLICATIONS

Kavajecz, K., "Table-Driven Testing," IBM Technical Disclosure Bulletin, Jan. 1988, pp. 441-445.
Enescu, M., "Automated Test Matrix Generator," Sep. 1992, p. 461.

* cited by examiner

*Primary Examiner*—Robert W. Beausoliel
*Assistant Examiner*—Michael Maskulinski
(74) *Attorney, Agent, or Firm*—Arthur J. Samodovitz; Hoffman, Warnick & D'Alessandro LLC (57) ABSTRACT

A method and system for testing a software product is provided. Specifically, a type template, an output template, and a table of test data pertaining to the software product are provided. The test data is processed by a test generation system based upon the type template and the output template to automatically generate a test script file having at least one test case. The test script file is then used to test the software product.

25 Claims, 5 Drawing Sheets

| Table | Actor | Steps | TF | FETF | PB | VMESSAGE |
|---|---|---|---|---|---|---|
| login | ACTOR | SETUP | TF | FETF | PB | VMESSAGE |
| Test the login dialog | | From | User Name | Password | Login | Message Text |
| Login with a valid username and password. <HIGH> | user | Login window *51* | dallin | mypassword | OK | Welcome! Your Login Was Successful. |
| Login with variations of an invalid password. <MEDIUM> | | | | MYPASSWORD; MyPassword; notmypassword | | Your User Name and Password Do Not Match. Please Try Again. |
| Login with blank password. | | *53* | | <TFBLANK> *55* | | Your Password Is Required. Please Enter A Valid Password. |
| Login with blank username. | | | <TFBLANK> *57* | mypassword | | Your User Name Is Required. Please Enter A Valid User Name. |
| Test the Cancel Button | | | NULL | NULL | Cancel | <VWINCLOSES> Login |

Tag: ACTOR
Description: Generic line for the actor
        <cell_contents> = The actor for this test.
Text: The actor for this test is <cell_contents>. ←— 90
Code:
End Code.

---

Tag: SETUP
Description: Setup step for standard (appstate-based) applications
        <actor> = The actor for this test. Should be in the actor column of the table.
Text: Navigate a <actor> to the <cell_contents>. ←— 92
Code:
End Code.

---

Tag: TF
Description: Enter text into a text field, also known as edit field or edit control.
        <cell_contents> = The text to enter into the text field.
        <object_name> = The name of the text field.
Text: Enter '<cell_contents>' into the <object_name> text field. ←— 94
Code:
End Code.

---

Tag: PB
Description: Clicking a push button.
        <cell_contents> = The name of the push button.
Text: Click the <cell_contents> push button. ←— 96
Code:
End Code.

---

Tag: VMESSAGE
Description: Verify a message or static text. Can be used to test messages appearing in message boxed
       or on other windows in the application.
        <cell_contents> = The expected message. ←— 98
Text: Verify a '<cell_contents>' message appears.
Code:
End Code.

---

Tag: TFBLANK
Description: Blanks a text field (removes all text in it).
        <object_name> = The name of the text field.
Text: Delete all of the text in the <object_name> field. ←— 100
Code:
End Code.

---

Tag: VWINCLOSES
Description: Verify a window closes.
        <cell_contents> = The window expected to close.
Text: Verify the <cell_contents> window closes. ←— 101
Code:
End Code.

Test Script Name: {script_filename} — 110
Test Script Description: {script_description} — 112
Test Execution: {testcase_list} — 114     ← 102
Author: Joe Smith
Creation Date: 1/1/01
Change History:

Test Case Name: {testcase_name} — 116
Description: {testcase_description} — 118
Actor: {actor} — 120                       ← 104
Steps:
    {steps} — 108

End Script                                 ← 106

*FIG. 4*

FIG. 5

METHOD AND SYSTEM FOR TESTING A SOFTWARE PRODUCT

BACKGROUND OF THE INVENTION

1. Field of the Invention

The present invention generally relates to a method and system for testing a software product. More particular, the present invention relates to a test generation system for automatically generating a test script file that is used to test a software product.

2. Background Art

As the use of computer technology becomes more prevalent, businesses are increasingly seeking software solutions to address their business needs. For example, a business might use accounting software to track their accounts receivable, while using inventory software to track their current inventory. Often, however, the software used in business fails, which results in substantial financial loss for the business. Accordingly, software technicians are constantly seeking new ways to test software prior to its implementation.

Currently, software is tested by generating a series "test cases." A test case is a sequence of steps that are required to perform a certain action within the software. For example, if a software product requires a user to login, a series of test cases could be designed to test whether the login process is functioning properly.

Heretofore, test case generation has been a manual process. Specifically, a test designer examines the documentation of the software product under test and the manually writes test cases based upon the documentation. Under such a scenario, however, the test designer must change the test cases if the documentation changes. Moreover, if test automation is required, the test designer must manually attempt to automate the tests. In the past, such a process was sufficient. However, as software achieves higher levels of complexity, and as they interact with more internal systems, the workload required to achieve the same quality is often beyond the time allotted in project schedules.

In view of the foregoing, a need exists for a comprehensive tool that can automatically generate test cases. In addition, a need exists for the generated test cases to be either automatically or manually run to test the software product.

SUMMARY OF THE INVENTION

The present invention overcomes the drawbacks of existing systems by providing a method and system for testing a software product. Specifically, the present invention provides a test generation system for automatically generating a test script file having test cases for testing a software product. To generate the test cases, the test generation tool is provided with a type template, an output template, and a table having test data for the software product being tested. The test generation system will process the test data based upon the type template and generate a test script file in a format dictated by the output template. The test script file has the test cases needed to test the software product. Depending on the format set forth in the output template, the test script file can be either manually run by a user, or automatically run by an automation tool. In either event, the test script file is run to test the software product.

According to a first aspect of the present invention, a method for testing a software product is provided. The method comprises the steps of: (1) providing a predefined template; (2) providing a table having test data for the software; (3) running a test generation system with the template to process the test data and to automatically generate a test script file; and (4) running the software product while using the generated test script file to test the software product.

According to a second aspect of the present invention, a method for testing a software product is provided. The method comprises the steps of: (1) providing a predefined template; (2) providing a table having test data for the software product; (3) running a test generation system with the template to process the test data and to automatically generate an executable test script file; and (4) running the software product while using an automation tool to run the executable test script file to test the software product.

According to a third aspect of the present invention, a method for testing a software product is provided. The method comprises the steps of: (1) entering a predefined type template into a test generation system; (2) entering a predefined output template into the test generation system; (3) entering a table having test data for the software product into the test generation system; (4) running the test generation system with the type template and the output template on a first computer system to process the test data to automatically generate an executable test script file; and (5) running the software product on a second computer while using an automation tool to run the executable test script file to test the software product.

According to a fourth aspect of the present invention, a system for testing a software product is provided. The system comprises: (1) an input system for receiving a type template, an output template, and a table having test data for the software product; and (2) a process system for processing the test data to automatically generate a test script file based upon the type template and the output template, wherein the generated test script file is used to test the software product.

According to a fifth aspect of the present invention, a system for testing a software product is provided. The system comprises: (1) a test generation system stored on a first computer system, wherein the test generation system comprises: (a) means for receiving an output template, a type template, and a table having test data for the software product; (b) means for processing the test data, based upon the type template and the output template, to automatically generate an executable test script file having at least one test case; and (c) means for outputting the executable generated test script file; and (2) an automation tool for running the executable test script file to test the software product, wherein the software product is stored on a second computer system.

According to a sixth aspect of the present invention, a program product, stored on a recordable medium, for testing a software product is provided. The program product comprises: (1) an input system for receiving a type template, an output template, and a table having test data for the software product; and (2) a process system for processing the test data to automatically generate a test script file based upon the type template and the output template, wherein the generated test script file is used to test the software product.

Therefore, the present invention provides a method and system for testing a software product.

BRIEF DESCRIPTION OF THE DRAWINGS

These and other features and advantages of this invention will be more readily understood from the following detailed description of the various aspects of the invention taken in conjunction with the accompanying drawings in which:

FIG. 3 depicts an exemplary view of a type template.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the description will have the following sections:

I. Definitions
II. General
III. Computer System
IV. Alternate Embodiment

I. Definitions

For the purposes of this disclosure, the following terms shall have the following meanings:

Actor: An entity performing a transaction with a software product.

Use Case: A transaction between an actor and a software product.

Test Case: A series of steps required to perform one possible variation of a transaction in a use case.

Test Script: A group of one or more test cases.

Test Script File: A file containing a test script.

Automation Tool: A software program that runs an executable test script file to automatically test a software product.

Executable Test Script File: A test script file that is in a code format for automatic implementation by an automation tool.

Documentation Test Script File: A test script file that is in a text or similar format for manual implementation by a human user.

II. General

In general, the present invention provides a system and method for testing a software product. Specifically, under the present invention a type template, an output template, and a table of test data pertaining to the software product being tested are provided. A test generation system will process the test data based upon the type template and the output template to automatically generate a test script file of test cases. The test script file can then be used to test the software product. In particular, the output template dictates the format of the generated test script file. The format can be either a documentation test script file that is manually run by a human user, or an executable file that is automatically run by an automation tool.

III. Computer System

Figure 1:
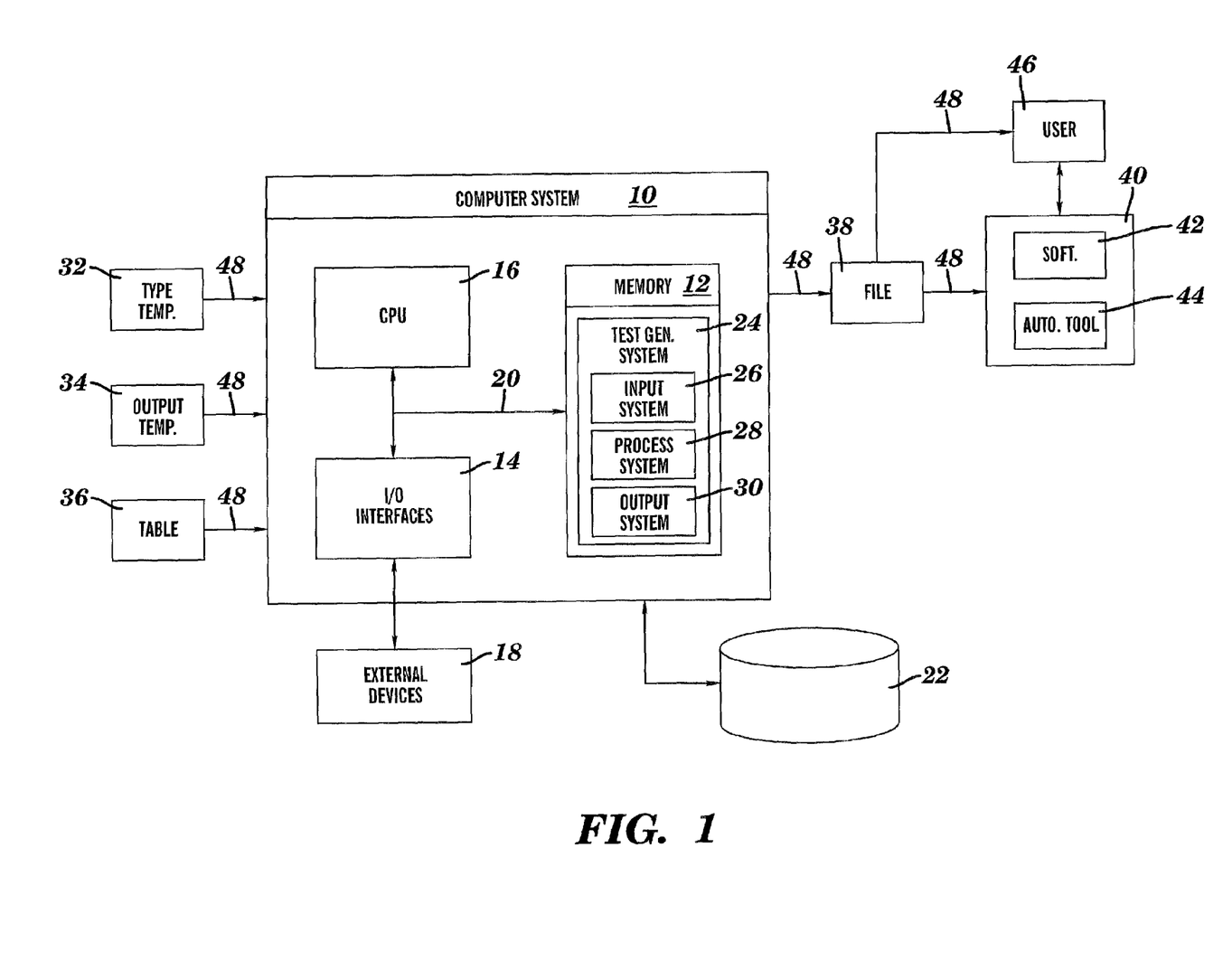
FIG. 1 depicts a computer system having a test generation system according to a first embodiment of the present invention.

Referring now to FIG. 1, computer system 10 is shown. Computer system 10 generally comprises memory 12, input/output interfaces 14, a central processing unit (CPU) 16, external devices/resources 18, bus 20, and database 22.

Stored in memory 12 of computer system 10 is test generation system 24 (shown in FIG. 1 as a software product). Test generation system 24 will be described in more detail below but generally provides a method and system for testing a software product 42. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand-held device, keyboard, mouse, voice recognition system, speech output system, printer, facsimile, pager, personal digital assistant, cellular phone, web phone, etc. Bus 20 provides a communication link between each of the components in the computer system 10 and likewise may comprise any known type of transmission link, including electrical, optical, wireless, etc. In addition, although not shown, additional components, such as cache memory, communication systems, system software, etc., may be incorporated into computer system 10.

Database 22 provides storage for information necessary to carry out the present invention. Such resources could include, inter alia: (1) type template 32; (2) output template 34; and (3) table 36. Database 22 may include one or more storage devices, such as a magnetic disk drive or an optical disk drive. In another preferred embodiment database 22 includes data distributed across, for example, a local area network (LAN), wide area network (WAN) or a storage area network (SAN) (not shown). Database 22 may also be configured in such a way that one of ordinary skill in the art may interpret it to include one or more storage devices.

Under the present invention, a type template 32, an output template 34, and a table 36 having test data pertaining to software product 42 are received by input system 26, and optionally stored in database 22. Process system 28 will process the test data in table 36 based upon type template 32, and automatically generate a test script file 38 having at least one test case. The test script file is generated in a format dictated by output template 36. As will be further described below, table 36 includes rows of test data. Preferably, a separate table is prepared for each potential use case. For example, if two possible use cases for software product 42 are: (1) test the login dialog; and (2) test the logout dialog, a separate table will be prepared for each use case. Moreover, each use case has one or more test cases. As defined above, a test case is a series of steps required to perform one possible variation of a transaction in a use case. For example, the use case of testing the login dialog could include the test cases of: (1) login with a valid username and password; (2) login with variations of an invalid password; (3) login with blank password; (4) login with blank user name; and (5) test the cancel button. Data for these use cases would be arranged into separate rows of table 36. Process system 28 will process the test data based upon type template 32 to automatically generate a test script file comprised of the test cases. The test script file will be in a format dictated by output template 34. Type template 32 and output template 34 are preferably flat ASCII files that contain macros and that represent the desired output.

Once generated, output system 30 will output the test script file 38. Test script file 38 can be provided to user 46 or directly to second computer system 40 where software product 42 is stored. As the software product 42 is running, test script file 38 will be run to test the software product 42. As shown in FIG. 1, an automation tool 44 can be utilized to automatically test software product 42. Specifically, automation tool 44 can be any application capable of running script case file 38 to test software product 42. If automation tool 44 is utilized, participation by user 46 is not necessary. Examples of automation tools include WinRunner and Silk. As will be further described below, in the event an automation tool 44 is utilized, test script file 38 should be generated and outputted by test generation system 24 as an executable file. If automation tool 44 is not utilized, test script file can be generated and outputted as a documentation (text) file containing instructions that can be run by user 46 to test the software product 42. In either event, the particular format of test script file 38 (e.g., executable, documentation, etc.) is set forth in output template 34. As shown in FIG. 1, test script file 38 can be outputted directly to second computer system 40 or to user 46. Moreover, although automation tool 44 is shown as being stored on second computer system 40, it should be appreciated that it could be stored outside of second computer system 44. For example, automation tool 44 could exist on a third computer system (not shown) and communicate with second computer system 40 via a network.

Figure 2:
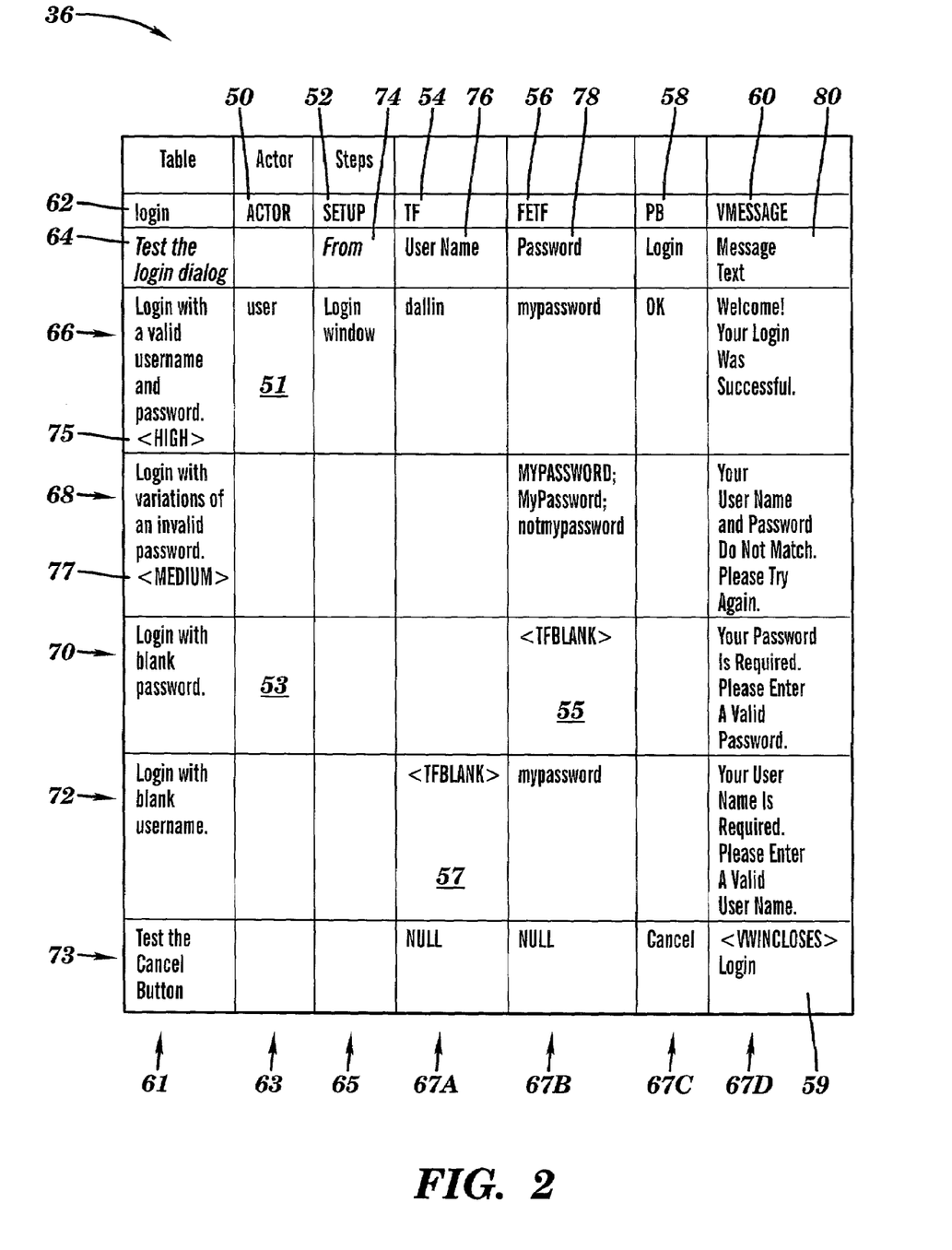
FIG. 2 depicts an exemplary view of a table.

Referring now to FIG. 2, an exemplary table 36 is shown. As depicted, table 36 includes a column-row matrix of test data. The test data pertains to five possible types of test cases for the use case of testing a login dialog (cell 64). Each test case is arranged into a separate row of table 36. The types of test cases shown include: (1) login with a valid user name and password (row 66); (2) login with variations of an invalid password (row 68); (3) login with blank password (row 70); (4) login with blank user name (row 72); and (5) test the cancel button (row 73). Each test case row includes a test case description (column 61), and actor (column 63), a starting point (column 65), and a series of test steps (columns 67A–D). Test case description sets forth a description of the test case for the corresponding row. For example, row 72 has a test case description of "login with blank user name." This indicates that a test case will be generated to test the outcome when a user logs into the software product with a blank user name. As further shown in FIG. 2, priority tags 75 and 77 can be assigned to one or more potential test cases. Priority tag "High" 75 indicates a feature that is historically buggy. Priority tag "Medium" 77 indicates a feature that historically has a few bugs. Priority tag "Low" (not shown) indicates a feature that is historically stable. If a row does not include a tag, "Low" is assumed. The use of priority tags allows the test cases to be performed in a certain order by a user or an automation tool. Specifically, row 66 has a priority tag of "High." Thus, the test case generated from this row will automatically be performed first by an automation tool. Similarly, if a user performs the test cases manually, the user will see the priority tags and perform the high priority test cases first. The actor (column 63) is the individual or group of individuals that will be running the particular test case. For test case rows 66, 68, 70, 72, and 73 the actor is "user." The starting point (column 65) indicates the location from which the test cases will be commenced. For all test case rows 66, 68, 70, 72, and 73, the starting point is the "login window." Test steps (columns 67A-D) enumerate the specific steps the actor must take from the starting point to fully perform each test case (as will be further explained below).

Cells 50, 52, 54, 55, 56, 56, 57, 58, 59, and 60 set forth the type headings for the cells thereunder. Type headings are user-defined and relate to the object headings set forth in cells 74, 76, 78, 80, and 82. Each type heading is defined in the type template and instructs the process system how to generate test cases from the test data in table 36, as will be further described below. Object headings define a particular object type in a software product being tested. For example, in an object-oriented GUI in which a user must enter content into a text field, an object heading may indicate a particular text field (e.g., the "user name" text field). Rows 66, 68, 70, 72, and 73 of table 36 each represent separate types of potential test cases. As described above, process system will process the test data in table 36 using the type template and the output template to automatically generate a test script file containing the test cases.

As shown in cell 62 of table 36, the table is entitled "login" and relates to the use case of testing the login dialog (cell 64). Cells 50, 52, 54, 55, 56, 57 58, 59, and 60 contain the type headings ACTOR, SETUP, TF, TFBLANK, FETF, PB, VWINCLOSES, and VMESSAGE. FIG. 3 depicts a type template in which the type headings are defined. Each type heading includes a tag, a description, and a text line that indicates the instruction that will be generated by process system. Moreover, each type heading shown in FIG. 3 utilizes macros (e.g., <cell_contents>). Each macro will effect a copying and pasting of test data from the table into the instruction indicated in the text line of each type heading. It should be appreciated that the "instructions" generated can be in a code intended to be implemented by the automation tool or in a text format for a user to manually implement.

As depicted, type heading ACTOR 90 indicates the actor for each test case, that is, who is performing the test cases. In determining the actor for each test case, the process system will copy the cell contents under the ACTOR type heading for each test case (i.e., row) in the table and paste it into the test script. This functionality is provided by the use of macros. As indicated above, the macros used in type template 32 copy and paste test data from a particular cell of table 36 to generate the test cases in the test script file. As shown in FIG. 3, for the ACTOR type heading 90, a macro entitled <cell_contents>is utilized. The <cell_contents>macro will cause a copying and pasting of test data from a corresponding cell of a test case row. In this case, this will cause the copying and pasting of any cell contents under the ACTOR type heading (column 63) for each test case (i.e., rows 66, 68, 70, 72, and 73) into the test script. Thus, the instruction of "the actor for this case is user" will be generated with respect to the test case in row 66. Moreover, since none of the subsequent rows 68, 70, 72, and 73 change the actor, "user" will remain the actor for the remaining test cases. In a preferred embodiment, a blank cell in a column will have the same test data value(s) as the last non-blank cell in the same column. For example, cell 53 will be deemed by process system 28 to have the same actor, namely "user," as cell 51.

Type heading SETUP 92, as used in cell 52 of table 36, defines the starting point for each test case. Thus, the cells in rows 66, 68, 70, and 72 that are beneath cell 52 (column 65) will set forth the point from which the user must start each respective test case. To indicate this, the type template 32 utilizes two macros: (1) <cell_contents>; and (2) <actor>. As indicated above, the macros used in type template 32 causes a copying from the table and pasting into an instruction. For row 66, the cell contents are "login window" and, as described above, the actor is "user." Thus, the SETUP type heading will result in generation of an instruction of "navigate a user to the login window." Similar to the ACTOR type heading 90 above, since none of the subsequent rows (68, 70, 72, and 73) indicate a different starting point, the login window will remain the starting point for all subsequent test cases.

Type heading TF 94 indicates a text field into which a user must enter some text. As shown, this type heading utilizes the macros of <cell_contents>and <object_name>. The cell contents are those listed in each row of the table 36 under cell 54 (column 67A). For the test case of row 66, the cell contents are "dallin." The use of object names provides further definition for the text field. Specifically, the <object_name>macro corresponds to the object headings in cells 74, 76, 78, 80, and 82. For cell 54, which uses type heading TF, the corresponding object heading of "user name" is set forth in cell 76. Thus, an instruction to the user of "enter dallin into the user name text field" will be generated. Since the user name "dallin" is not changed until row 72, the test cases of rows 68 and 70 will have the same instruction line. In some cases, the type heading FETF might be used. This allows a single cell in a row (e.g., row 68) to enumerate multiple test data elements (as will be further described below).

Type heading PB 96 relates to clicking a push button. Similar to previous type headings, the PB type heading 96 utilizes the <cell_contents>macro. This will cause a copying and pasting of the cell contents for each test case row 66, 68, 70, and 72 under cell 80 (column 67C) from table 36 and into an instruction. The resulting instruction to the user for the test case in row 66 (as well as rows 68, 70, and 72 since the OK was not changed) is "click the OK pushbutton."

Type Heading VMESSAGE 98 asks a user to verify a particular message or text. This is generally used when a specific message is supposed to be presented to a user. Once again, the <cell_contents>macro was used and results in the contents of the cells in rows 66, 68, 70, 72, and 73 under cell 60 (column 67D) to be copied and pasted into an instruction. For row 66, the instruction will appear as "verify a 'welcome! your login was successful' message appears." Since the cell content changes for each subsequent row, the instruction will also change.

Type Heading TFBLANK 100 is used in cells 55 and 57 of table 36 and requests removal of all text from a text field. This type heading uses the <object_name>macro and as such, relates to the object headings in cells 76 and 78. When used in table 36, it will result in an instruction to a user to delete all contents from a particular text field. For cell 55 of row 70, it will result in an instruction of "delete all of the text in the password field." For cell 57 of row 72, it will result in generation of an instruction to "delete all text in the user name field."

Type heading VWINCLOSES 101 is used in cell 59 of table 36 and requests verification from the user that a particular window has closed. This type heading uses the <cell_contents>macro so that any text within cell 59 will be copied and pasted into the generated instruction. Accordingly the instruction for row 73 will be "verify the login window closes."

Thus, type template 32 provides a key by which test cases are generated based upon the test data in table 36. Referring back to table 36, the test data is shown. Using the explanation set forth above, the following test cases will be generated:

A. Login with a Valid User Name and Password

Row 66 corresponds to the test case of logging in with a valid user name and password. Using the type template as explained above, the actor is "user" and the starting point is the "login window." Once at the login window, the user will be prompted to enter the user name "dallin" into the user name text field. Next, the user will be prompted to enter the password "mypassword" into the password text field. After entering the password, the user will be prompted to click the OK pushbutton and then verify the text message "welcome! your login was successful."

B. Login with Multiple Variations of an Invalid Password

Row 68 corresponds to the test case of testing login with variations of an invalid password. As indicated above, since the actor, setup, user name text field, and login push button cells were left blank, they will remain the same. Thus, the user will be instructed to start from the login window and enter the user name "dallin" into the user name text field. Next, the user will be instructed to enter the password "MYPASSWORD" into the password text field and then click the OK push button. Then, the user will be asked to verify the text message "your user name and password do not match. please try again."

As shown the type heading FETF is used in table 36. This means that for each test data element in a given cell, the corresponding instruction will be generated. Thus, for row 68, after the text message was verified for "MYPASSWORD," the user would be prompted to enter the password "MyPassword" and verify the same message. Then, the user would be prompted to enter the password "notmypassword" and verify the message. The use of FE (for each) thus allows multiple variations of a test case to be generated from a single row of the table. In previous systems, each variation would have to be entered into a separate row of table 36. In a preferred embodiment, multiple test data elements are separated in a cell by semi-colons or the like.

C. Login in with Blank Password

Row 70 pertains to the test case of logging in with a blank password. For this test case, the user will be instructed to start from the login window, enter the user name "dallin" into the user name text field, and delete all contents from the password field. Then, the user will be instructed to click the "OK" pushbutton and verify the message "your password is required. please enter a valid password."

D. Login with Blank User Name

Row 72 corresponds to the login with a blank user name test case. In this test case, a user will be asked to start from the login window and delete all contents from the user name text field. Then, the user will be prompted to enter the password "mypassword" into the password text field and click the "OK" push button. Once clicked, the user will be instructed to verify the message "your user name is required. please enter a valid user name."

E. Test the Cancel Button

Row 73 corresponds to aborting the login in process by clicking the cancel button (as opposed to the OK button). Once again, the user will begin from the login window. The cell contents NULL appear in columns 67A-B of row 73 to indicate these columns should be ignored when generating a test case for row 73. Thus, the user will not be prompted to interface with either the user name text field or the password text field (columns 67A-B). Rather, the user will be asked to click the cancel button and verify that the login window closes.

It should be understood that the test data and templates shown herein are intended to be illustrative only and are not exhaustive. Specifically, templates and tables under the present invention are user definable and, accordingly, an infinite quantity of variations could exist. For example, test data for one or more additional test cases for testing a login dialog could have been included in table 36. Moreover, it should be appreciated that the present invention is not limited to testing a login dialog.

Figure 4:
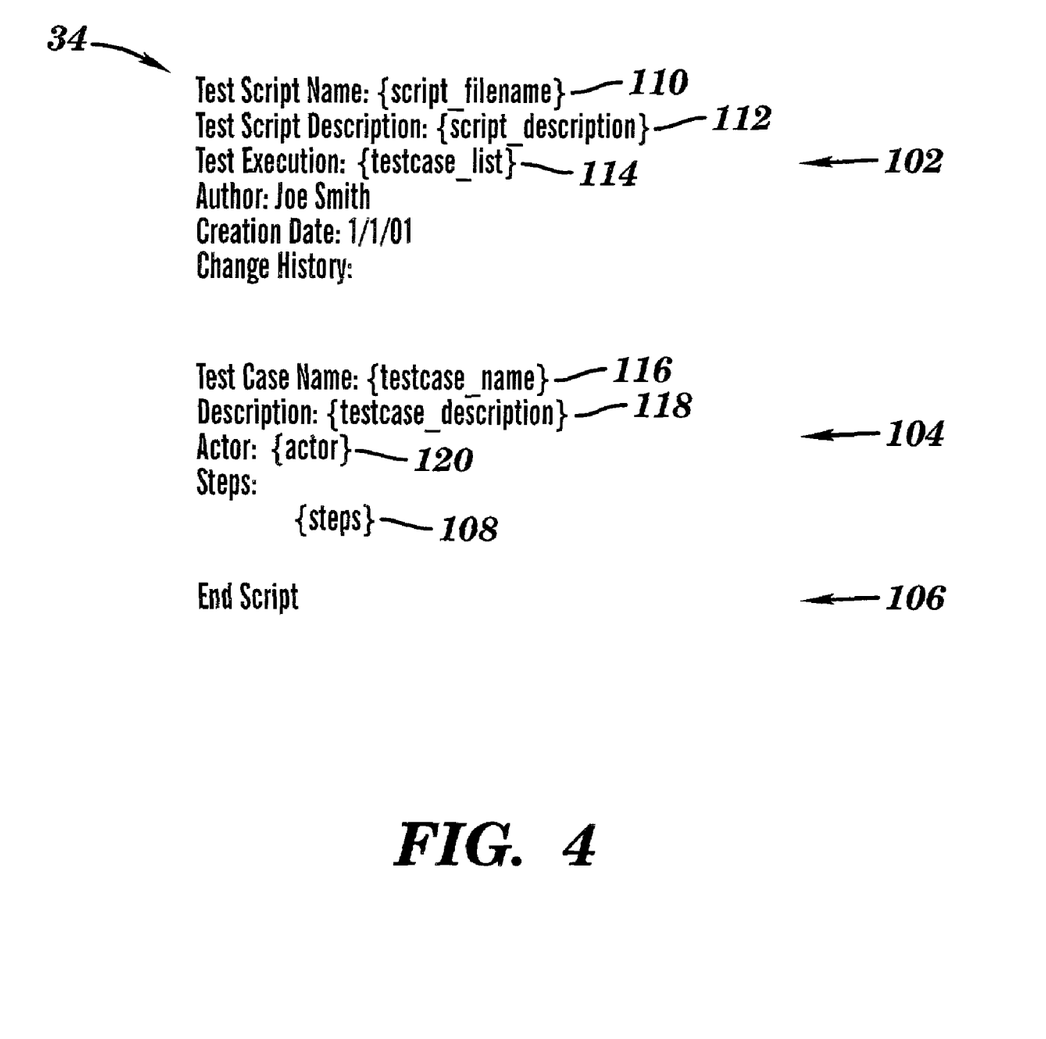
FIG. 4 depicts an exemplary view of an output template.

Referring to FIG. 4, an exemplary output template 34 is shown in greater detail. Output template 34 dictates the format of the generated test script file and includes header 102, body 104, and footer 106. Header 102 includes some biographical information about the test script file including the test script name name, test script description, test execution, author, creation data, and change history. Test execution dictates the names of each test case. In a preferred embodiment, the test cases generated from table 36 will have the names login_1, login_2, login_3, login_4, login_5, login_6, and login_7. These names are based upon the name/title of table 36 as shown in cell 62. Specifically, each test case generated from table 36 is given a name that includes the name of the table (i.e., login), and a numeric identifier corresponding to the quantity of test cases generated from rows 66, 68, 70, 72, and 73. Since row 68 resulted in three test cases (i.e., one for each password variation), a total of seven test cases were generated from table 36.

Output template 34 can also includes macros that place the generated test cases into a particular format. For example, the {steps} macro 108 is used to dictate that the test script file should be a documentation test script file. When a documentation test script file is generated, the test script file will be saved in a text format for manual implementation by a user. When the {code} macro (not shown) is used, the test script file will be an executable file for implementation by an automation tool. It should be appreciated that since each automation tool may require a different format, a separate output template 34 could be prepared for each automation tool. It should also be appreciated that the test generation system can generate both an executable test script file and a documentation test script file (or a combination of both) when both the {steps} and {code} macros are included.

As further shown in FIG. 4, other macros 110, 112, 114, 116, 118, and 120 could be used in output template 34 to retrieve (i.e., copy and paste) information from table 36. For example, {script_filename} macro 110 would retrieve the filename "login" from cell 62 of table 36. Once retrieved, a user could then further vary the format of the test script file by designating a particular file extension for the retrieved test script filename. For example, the user could cause the tests script file to be saved in HTML format by making the test script filename "login.html."

Body 104 of output template 34 sets forth how the test cases will be arranged for the user or automation tool. Specifically, based upon the output template shown in FIG. 4, each test case will have four lines, namely, test case name, description, actor, and steps. Thus each of the above test cases will resemble the format set forth in body 104. It should be understood that the arrangement of test cases into the format specified in body 104 can be accomplished with the use of macros. Footer 106 indicates the end of the test script for a user or an automation tool.

Below are examples of how the test cases would appear if generated by test generation system based upon the table and templates of FIGS. 2–4.

1. Testcase login_1

Description:
   Login with a valid username and password.
   The actor is: user

Steps:
   1. Navigate a user to the Login window.
   2. Enter 'dallin' into the User Name text field.
   3. Enter 'mypassword' into the Password text field.
   4. Click the OK pushbutton.
   5. Verify a 'Welcome! Your Login Was Successful.' message appears.

2. Testcase login_2

Description:
   Login with variations of an invalid password.
   The actor is: user Steps:
   1. Navigate a user to the Login window.
   2. Enter 'dallin' into the User Name text field.
   3. Enter 'MYPASSWORD' into the Password text field.
   4. Click the OK pushbutton.
   5. Verify a 'Your User Name and Password Do Not Match. Please Try Again.' message appears.

3. Testcase login_3

Description:
   Login with variations of an invalid password.
   The actor is: user Steps:
   1. Navigate a user to the Login window.
   2. Enter 'dallin' into the User Name text field.
   3. Enter 'MyPassword' into the Password text field.
   4. Click the OK pushbutton.
   5. Verify a 'Your User Name and Password Do Not Match. Please Try Again.' message appears.

4. Testcase login_4

Description:
   Login with variations of an invalid password.
   The actor is: user Steps:
   1. Navigate a user to the Login window.
   2. Enter 'dallin' into the User Name text field.
   3. Enter 'notmypassword' into the Password text field.
   4. Click the OK pushbutton.
   5. Verify a 'Your User Name and Password Do Not Match. Please Try Again.' message appears.

5. Testcase login_5

Description:
   Login with blank password.
   The actor is: user

Steps:
   1. Navigate a user to the Login window.
   2. Enter 'dallin' into the User Name text field.
   3. Delete all of the text in the Password text field.
   4. Click the OK pushbutton.
   5. Verify a 'Your Password Is Required. Please Enter A Valid Password.' message appears.

6. Testcase login_6

Description:
   Login with blank username.
   The actor is: user

Steps:
   1. Navigate a user to the Login window.
   2. Delete all of the text in the User Name text field.
   3. Enter 'mypassword' into the Password text field.
   4. Click the OK pushbutton.

5. Verify a 'Your User Name Is Required. Please Enter A Valid User Name.' message appears.

7. Testcase login_7

Description:
  Test the cancel button.
  The actor is: user

Steps:
  1. Navigate a user to the Login window.
  2. Click the CANCEL pushbutton.
  3. Verify the login window closes.

Since, the {steps} macro was utilized in the output template 34 of FIG. 4, the test cases would be presented in a text format, as shown above, in a documentation test script file. However, it should be appreciated that the steps could be presented as code in an executable test script file for use by an automation tool.

IV. Alternate Embodiment

Figure 5:
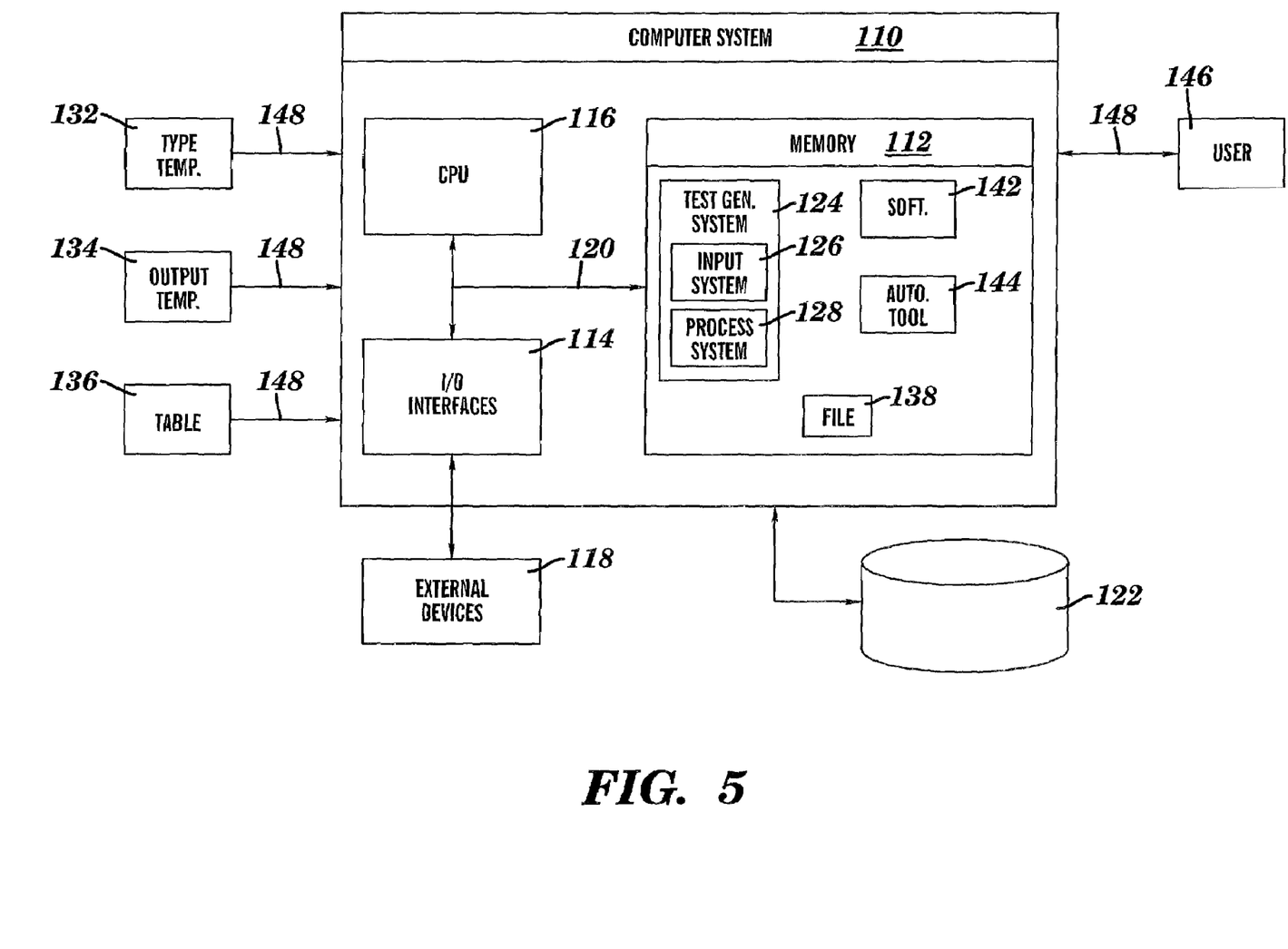
FIG. 5 depicts a computer system having a test generation system according to a second embodiment of the present invention.

Referring now to FIG. 5, an alternate embodiment of the present invention is shown. As depicted computer system 110 includes memory 112, I/O interfaces 114, CPU 116, external devices 118, bus 120, and database 122 similar to computer system 10 of FIG. 1. Moreover, type template, 132 output template 134, and table 136, similar to those shown in FIGS. 2-4, are received and processed by test generation system 124. However, under this embodiment, the software product 142 and test generation system 124 both reside on the same computer system 110. Thus, type template 132, output template 134, and table 136 are received by input system 126, and processed by process system 128 to automatically generate a test script file 138 in the manner described above. However, instead of outputting the generated test script file for testing a software product on a second computer system, the test script file 138 can remain in memory 112 of computer system 110. Similarly, automation tool 144 can be stored on computer system 110 to cause the automatic testing of software product 142 (if test script file 138 is an executable test script file). Conversely, if a documentation test script file is generated, user 146 can communicated with computer system 110 to manually implement the test cases therein. In addition, it should be understood that automation tool 144 need not reside on computer system 110. In contrast, automation tool 144 could exist outside of computer system 110 and communicate with computer system 110 via a network.

As further depicted in FIGS. 1 and 5, communication with computer systems 10, 40, and 110 occurs via communication links 48 and 148. Communications links 48 and 148 can include a direct hardwired connection to the computer systems 10, 40 or 110, or an addressable connection such as a remote system in a client-server environment. In the case of the latter, the client and server may be connected via the Internet, wide area networks (WAN), local area networks (LAN) or other private networks. The server and client may utilize conventional token ring connectivity, Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system.

It is understood that the present invention can be realized in hardware, software, or a combination of hardware and software. Moreover, any kind of computer/server system(s)—or other apparatus adapted for carrying out the methods described herein—is suited. A typical combination of hardware and software could be a general purpose computer system with a computer program that, when loaded and executed, controls computer systems 10, 40 and 110 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for testing a software product, comprising the steps of: providing a predefined template;
  providing a table having test data for the software product, the table being a column-row matrix of test data;
  running a test generation system with the template to process the test data and to automatically generate a test script file; and
  running the software product while using the generated test script file to test the software product;
  wherein the test data is arranged into at least one row of potential test cases that each include an actor that indicates who is performing the potential test cases, a starting point that indicates the location from which the potential test cases will be commenced, and a test step required to perform one possible variation of a transaction.

2. The method of claim 1, wherein the test script file contains at least one test case generated based upon the test data and the template.

3. The method of claim 2, wherein the template is a type template having at least one macro, and wherein the type template provides a key for the test generation system to generate the at least one test case based upon the test data.

4. The method of claim 1, further comprising the step of providing an output template, wherein the output template has at least one macro and dictates a format of the generated test script file.

5. The method of claim 1, wherein the test script file is an executable file that is automatically run by an automation tool.

6. The method of claim 1, wherein the test script file is a documentation file that is manually run by a user.

7. The method of claim 1, wherein the test generation system and the software product reside on different computer systems.

8. The method of claim 1, wherein, the test generation system and the software product reside on the same computer system.

9. A method for testing a software product, comprising the steps of:
providing a predefined template;
providing a table having test data for the software product, the table being a column-row matrix of test data;
running a test generation system with the template to process the test data and to automatically generate an executable test script file; and
running the software product while using an automation tool to run the executable test script file to test the software product;
wherein the test data is arranged into at least one row of potential test cases that each include an actor that indicates who is performing the potential test cases, a starting point that indicates the location from which the potential test cases will be commenced, and a test step required to perform one possible variation of a transaction.

10. The method of claim 9, wherein the predefined template is a type template that provides a key for the test generation system to generate a test case from the test data.

11. The method of claim 9, wherein the type template includes at least one macro.

12. The method of claim 9, further comprising the step of providing an output template having at least one macro and that dictates the format of the generated test script file.

13. The method of claim 9, wherein the test script file includes at least one test case automatically generated by the test generation system based upon the test data.

14. A method for testing a software product, comprising the steps of:
entering a predefined type template into a test generation system;
entering a predefined output template into the test generation system;
entering a table having test data for the software product into the test generation system, the table being a column-row matrix of test data;
running the test generation system with the type template and the output template on a first computer system to process the test data to automatically generate an executable test script file; and
running the software product on a second computer while using an automation tool to run the executable test script file to test the software product;
wherein the table comprises at least one row of potential test cases that each include an actor that indicates who is performing the potential test cases, a starting point that indicates the location from which the potential test cases will be commenced, and a test step required to perform one possible variation of a transaction.

15. A system testing a software product, comprising:
an input system for receiving a type template, an output template, and a table having test data for the software product, the table being a column-row matrix of test data; and
a process system for processing the test data to automatically generate a test script file based upon the type template and the output template, wherein the generated test script file is used to test the software product;
wherein the table comprises at least one row of potential test cases that each include an actor that indicates who is performing the potential test cases, a starting point that indicates the location from which the potential test cases will be commenced, and a test step required to perform one possible variation of a transaction.

16. The system of claim 15, wherein the type template provides a key for generating the test script file based upon the test data, and wherein the tests script file includes at least one test case.

17. The system of claim 15, wherein the output template dictates a format of the test script file.

18. The system of claim 15, wherein the test script file is an executable test script file that is automatically ran by an automation tool to test the software product.

19. The system of claim 15, wherein the test script file is a documentation file that is manually run by a user to test the software product.

20. A system for testing a software product, comprising:
a test generation system stored on a first computer system, wherein the test generation system comprises:
means for receiving an output template, a type template, and a table having test data for the software product, the table being a column-row matrix of test data;
means for processing the test data, based upon the type template and the output template, to automatically generate an executable test script file having at least one test case;
means for outputting the executable test script file; and
an automation tool for running the executable test script file to test the software product, wherein the software product is stored on a second computer system;
wherein the table comprises at least one row of potential test cases that each include an actor that indicates who is performing the potential test cases, a starting point that indicates the location from which the potential test cases will be commenced, and a test step required to perform one possible variation of a transaction.

21. A program product, stored on a computer readable medium, for testing a software product, comprising:
an input system for receiving a type template, an output template, and a table having test data for the software product, the table being a column-row matrix of test data; and
a process system for processing the test data to automatically generate a test script file based upon the type template and the output template, wherein the generated test script file is used to test the software product;
wherein the table comprises at least one row of potential test cases that each include an actor that indicates who is performing the potential test cases, a starting point that indicates the location from which the potential test cases will be commenced, and a test step required to perform one possible variation of a transaction.

22. The program product of claim 21, wherein the type template provides a key for generating the test script file based upon the test data, and wherein the tests script file includes at least one test case.

23. The program product of claim 21, wherein the output template dictates a format of the test script file.

24. The program product of claim 21, wherein the test script file is an executable test script file that is automatically run by an automation tool to test the software product.

25. The program product of claim 21, wherein the test script file is a documentation file that is manually run by a user to test the software product.

* * * * *

UNITED STATES PATENT AND TRADEMARK OFFICE
CERTIFICATE OF CORRECTION

| | | |
|---|---|---|
| PATENT NO. | : 7,058,857 B2 | Page 1 of 1 |
| APPLICATION NO. | : 09/973748 | |
| DATED | : June 6, 2006 | |
| INVENTOR(S) | : Michael Dean Dallin | |

It is certified that error appears in the above-identified patent and that said Letters Patent is hereby corrected as shown below:

Column 14, Line 11, Please Remove " ran " and insert -- run --.

Column 14, Line 37, Please Remove " computer readable medium " and insert -- recordable medium --.

Signed and Sealed this

Fifteenth Day of August, 2006

JON W. DUDAS
*Director of the United States Patent and Trademark Office*